(12) United States Patent
Fritz et al.

(10) Patent No.: US 11,944,990 B2
(45) Date of Patent: Apr. 2, 2024

(54) COATING DEVICE FOR COATING COMPONENTS

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Moritz Bubek, Ludwigsburg (DE); Timo Beyl, Besigheim (DE); Frank Herre, Oberriexingen (DE); Steffen Sotzny, Oberstenfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 392 days.

(21) Appl. No.: 16/468,693

(22) PCT Filed: Dec. 1, 2017

(86) PCT No.: PCT/EP2017/081102
§ 371 (c)(1),
(2) Date: Jun. 12, 2019

(87) PCT Pub. No.: WO2018/108565
PCT Pub. Date: Jun. 21, 2018

(65) Prior Publication Data
US 2020/0078813 A1    Mar. 12, 2020

(30) Foreign Application Priority Data
Dec. 14, 2016   (DE) .................... 10 2016 014 952.3

(51) Int. Cl.
*B05B 12/00*   (2018.01)
*B05B 1/14*   (2006.01)
(Continued)

(52) U.S. Cl.
CPC ............... *B05B 12/00* (2013.01); *B05B 1/14* (2013.01); *B05B 13/0452* (2013.01);
(Continued)

(58) Field of Classification Search
CPC ...... B05B 12/02; B05B 12/04; B05B 13/0431
See application file for complete search history.

(56) References Cited

U.S. PATENT DOCUMENTS 3,421,694 A   1/1969   Muller
3,717,306 A   2/1973   Hushon et al.
(Continued)

FOREIGN PATENT DOCUMENTS

CN   2287527 Y   8/1998
CN   1331661 A   1/2002
(Continued)

OTHER PUBLICATIONS

Chinese Office Action and Search Report for CN201780077603.3 dated Oct. 12, 2020 (15 pages; English translation not available).
(Continued)

*Primary Examiner* — Dah-Wei D. Yuan
*Assistant Examiner* — Stephen A Kitt
(74) *Attorney, Agent, or Firm* — Bejin Bieneman PLC

(57) ABSTRACT

The disclosure concerns a coating device for coating components with a coating agent, in particular for painting motor vehicle body components, with a printhead, a multi-axis coating robot and with a robot control which controls the coating robot. The disclosure additionally provides for a separate printhead control which controls the printhead valve of the printhead.

21 Claims, 3 Drawing Sheets

(51) Int. Cl.
    *B05B 12/12*    (2006.01)
    *B05B 12/14*    (2006.01)
    *B05B 13/04*    (2006.01)

(52) U.S. Cl.
    CPC ............. *B05B 12/12* (2013.01); *B05B 12/149*
                     (2013.01); *B05B 13/0431* (2013.01)

(56) References Cited

U.S. PATENT DOCUMENTS

| | | |
|---|---|---|
| 3,981,320 A | 9/1976 | Wiggins |
| 4,141,231 A | 2/1979 | Kudlich |
| 4,375,865 A | 3/1983 | Springer |
| 4,383,264 A | 5/1983 | Lewis |
| 4,423,999 A | 1/1984 | Choly |
| 4,430,010 A | 2/1984 | Zrenner et al. |
| 4,435,719 A | 3/1984 | Snaper |
| 4,478,241 A | 10/1984 | Cardenas-Franco |
| 4,555,719 A | 11/1985 | Arway et al. |
| 4,593,360 A | 6/1986 | Cocks |
| 4,668,948 A | 5/1987 | Merkel |
| 4,714,044 A | 12/1987 | Kikuchi |
| 4,734,711 A | 3/1988 | Piatt et al. |
| 4,826,135 A | 5/1989 | Mielke |
| 4,894,252 A | 1/1990 | Bongen et al. |
| 4,941,778 A | 7/1990 | Lehmann |
| 4,974,780 A | 12/1990 | Nakamura et al. |
| 4,985,715 A | 1/1991 | Cyphert et al. |
| 5,050,533 A | 9/1991 | Zaber |
| 5,072,881 A | 12/1991 | Taube, III |
| 5,429,682 A * | 7/1995 | Harlow, Jr. ........... B05B 7/0815 |
| | | 118/681 |
| 5,435,884 A | 7/1995 | Simmons et al. |
| 5,538,221 A | 7/1996 | Joswig |
| 5,556,466 A | 9/1996 | Martin et al. |
| 5,602,575 A | 2/1997 | Pauly |
| 5,636,795 A | 6/1997 | Sedgwick et al. |
| 5,647,542 A | 7/1997 | Diana |
| 5,659,347 A | 8/1997 | Taylor |
| 5,681,619 A | 10/1997 | Ogasawara |
| 5,740,967 A | 4/1998 | Simmons et al. |
| 5,843,515 A | 12/1998 | Crum et al. |
| 5,951,882 A | 9/1999 | Simmons et al. |
| 5,964,407 A | 10/1999 | Sandkleiva |
| 5,976,343 A | 11/1999 | Schlaak |
| 6,179,217 B1 | 1/2001 | Yoshida et al. |
| 6,325,302 B1 * | 12/2001 | Guzowski ................. B05B 1/14 |
| | | 239/128 |
| 6,540,835 B2 | 4/2003 | Kim et al. |
| 6,607,145 B1 | 8/2003 | Boriani et al. |
| 6,641,667 B2 | 11/2003 | Ochiai et al. |
| 6,712,285 B2 | 3/2004 | Provenaz et al. |
| 6,777,032 B2 | 8/2004 | Ogasahara et al. |
| 6,811,807 B1 | 11/2004 | Zimmermann et al. |
| 6,849,684 B2 | 2/2005 | Poppe et al. |
| 7,160,105 B2 | 1/2007 | Edwards |
| 7,178,742 B2 | 2/2007 | Nellentine et al. |
| 7,182,815 B2 | 2/2007 | Katagami et al. |
| 7,244,310 B2 | 7/2007 | Edwards |
| 7,270,712 B2 | 9/2007 | Edwards |
| 7,357,959 B2 | 4/2008 | Bauer |
| 7,387,071 B2 | 6/2008 | Heinke et al. |
| 7,449,070 B2 | 11/2008 | Fellingham |
| 7,604,333 B2 | 10/2009 | Horsnell |
| 7,757,632 B2 | 7/2010 | Edwards |
| 7,837,071 B2 | 11/2010 | Achrainer |
| 7,901,741 B2 | 3/2011 | Katagami et al. |
| 8,028,651 B2 | 10/2011 | Rademacher et al. |
| 8,118,385 B2 | 2/2012 | Van De Wynckel et al. |
| 8,449,087 B2 | 5/2013 | Kataoka et al. |
| 8,545,943 B2 | 10/2013 | Frankenberger et al. |
| 8,652,581 B2 | 2/2014 | Merchant |
| 8,678,535 B2 | 3/2014 | Beier et al. |
| 8,875,655 B2 | 11/2014 | Pettersson et al. |
| 8,882,242 B2 | 11/2014 | Beier et al. |
| 9,010,899 B2 | 4/2015 | Harjee et al. |
| 9,108,424 B2 | 8/2015 | Wallsten et al. |
| 9,140,247 B2 | 9/2015 | Herre et al. |
| 9,156,054 B2 | 10/2015 | Ikushima |
| 9,266,353 B2 | 2/2016 | Beier et al. |
| 9,393,787 B2 | 7/2016 | Ikushima |
| 9,464,573 B2 | 10/2016 | Remy et al. |
| 9,592,524 B2 | 3/2017 | Fritz et al. |
| 9,701,143 B2 | 7/2017 | Ikushima |
| 9,707,585 B2 | 7/2017 | Reimert et al. |
| 9,844,792 B2 | 12/2017 | Pettersson et al. |
| 9,901,945 B2 | 2/2018 | Fehr et al. |
| 9,914,150 B2 | 3/2018 | Pettersson et al. |
| 10,016,977 B2 | 7/2018 | Stefani et al. |
| 10,105,946 B2 | 10/2018 | Nakamura et al. |
| 10,150,304 B2 | 12/2018 | Herre et al. |
| 10,252,552 B2 | 4/2019 | Pitz et al. |
| 10,272,677 B2 | 4/2019 | Stefani et al. |
| 10,532,569 B2 | 1/2020 | Wallsten et al. |
| 2001/0017085 A1 | 8/2001 | Kubo et al. |
| 2001/0019340 A1 | 9/2001 | Kubo et al. |
| 2002/0024544 A1 | 2/2002 | Codos |
| 2002/0043280 A1 | 4/2002 | Ochiai et al. |
| 2002/0043567 A1 | 4/2002 | Provenaz et al. |
| 2002/0105688 A1 | 8/2002 | Katagami et al. |
| 2002/0109741 A1 | 8/2002 | Okabe et al. |
| 2002/0128371 A1 | 9/2002 | Poppe et al. |
| 2003/0020783 A1 | 1/2003 | Sanada |
| 2003/0041884 A1 | 3/2003 | Bahr |
| 2003/0049383 A1 | 3/2003 | Ogasahara et al. |
| 2004/0028830 A1 | 2/2004 | Bauer |
| 2004/0089234 A1 | 5/2004 | Hagglund et al. |
| 2004/0107900 A1 | 6/2004 | Clifford et al. |
| 2004/0123159 A1 | 6/2004 | Kerstens |
| 2004/0173144 A1 | 9/2004 | Edwards |
| 2004/0221804 A1 | 11/2004 | Zimmermann et al. |
| 2004/0231594 A1 | 11/2004 | Edwards |
| 2004/0238522 A1 | 12/2004 | Edwards |
| 2004/0256501 A1 | 12/2004 | Mellentine et al. |
| 2004/0261700 A1 | 12/2004 | Edwards |
| 2005/0000422 A1 | 1/2005 | Edwards |
| 2005/0015050 A1 | 1/2005 | Mowery et al. |
| 2005/0016451 A1 | 1/2005 | Edwards |
| 2005/0023367 A1 | 2/2005 | Reighard et al. |
| 2005/0156963 A1 | 7/2005 | Song et al. |
| 2005/0243112 A1 | 11/2005 | Kobayashi et al. |
| 2006/0061613 A1 | 3/2006 | Fienup et al. |
| 2006/0068109 A1 | 3/2006 | Frankenberger et al. |
| 2006/0146379 A1 | 7/2006 | Katagami et al. |
| 2006/0238587 A1 | 10/2006 | Horsnell |
| 2006/0251796 A1 | 11/2006 | Fellingham |
| 2007/0062383 A1 | 3/2007 | Gazeau |
| 2007/0292626 A1 | 12/2007 | Larsson et al. |
| 2008/0271674 A1 | 11/2008 | Rademarcher |
| 2008/0309698 A1 | 12/2008 | Nakano et al. |
| 2009/0027433 A1 | 1/2009 | Van De Wynckel et al. |
| 2009/0029069 A1 | 1/2009 | Edwards |
| 2009/0117283 A1 | 5/2009 | Herre |
| 2009/0181182 A1 | 7/2009 | Sloan |
| 2010/0132612 A1 | 6/2010 | Achrainer |
| 2010/0156970 A1 | 6/2010 | Ikushima |
| 2010/0170918 A1 | 7/2010 | Achrainer |
| 2010/0225685 A1 | 9/2010 | Kwon et al. |
| 2010/0279013 A1 | 11/2010 | Frankenberger et al. |
| 2010/0282283 A1 | 11/2010 | Bauer |
| 2010/0321448 A1 | 12/2010 | Buestgens et al. |
| 2011/0014371 A1 | 1/2011 | Herre et al. |
| 2011/0084150 A1 | 4/2011 | Merchant |
| 2011/0248046 A1 | 10/2011 | Simion |
| 2011/0262622 A1 | 10/2011 | Herre |
| 2012/0085842 A1 | 4/2012 | Ciardella |
| 2012/0105522 A1 | 5/2012 | Wallsten |
| 2012/0114849 A1 | 5/2012 | Melcher |
| 2012/0162331 A1 | 6/2012 | Kataoka |
| 2012/0186518 A1 | 7/2012 | Herre |
| 2012/0219699 A1 | 8/2012 | Pettersson et al. |
| 2012/0249679 A1 | 10/2012 | Beier et al. |
| 2012/0282405 A1 | 11/2012 | Herre |
| 2013/0201243 A1 | 8/2013 | Yoshida |

(56) References Cited

U.S. PATENT DOCUMENTS

| | | | |
|---|---|---|---|
| 2013/0215203 | A1 | 8/2013 | Chen |
| 2013/0257984 | A1 | 10/2013 | Beier et al. |
| 2013/0284833 | A1 | 10/2013 | Fritz et al. |
| 2014/0076985 | A1 | 3/2014 | Pettersson et al. |
| 2014/0242285 | A1 | 8/2014 | Pettersson et al. |
| 2014/0329001 | A1* | 11/2014 | Rouaud .............. B05B 13/0431 427/9 |
| 2015/0009254 | A1 | 1/2015 | Kaiba et al. |
| 2015/0042716 | A1 | 2/2015 | Beier et al. |
| 2015/0086723 | A1 | 3/2015 | Bustgens |
| 2015/0098028 | A1 | 4/2015 | Ohnishi |
| 2015/0328654 | A1 | 11/2015 | Schwab |
| 2015/0375258 | A1 | 12/2015 | Fritz et al. |
| 2015/0375507 | A1 | 12/2015 | Ikushima |
| 2016/0052312 | A1 | 2/2016 | Pitz et al. |
| 2016/0074822 | A1 | 3/2016 | Han |
| 2016/0288552 | A1 | 10/2016 | Ikushima |
| 2016/0306364 | A1 | 10/2016 | Ikushima et al. |
| 2017/0087837 | A1 | 3/2017 | Stefani et al. |
| 2017/0106393 | A1 | 4/2017 | Hamspon et al. |
| 2017/0136481 | A1 | 5/2017 | Fritz et al. |
| 2017/0252765 | A1 | 9/2017 | Medard |
| 2017/0267002 | A1 | 9/2017 | Pitz et al. |
| 2017/0299088 | A1 | 10/2017 | Rau |
| 2017/0361346 | A1 | 12/2017 | Lahidjanian et al. |
| 2018/0022105 | A1 | 1/2018 | Nakamura et al. |
| 2018/0056670 | A1 | 3/2018 | Kerr |
| 2018/0093491 | A1 | 4/2018 | Murayama et al. |
| 2018/0178505 | A1 | 6/2018 | Stefani et al. |
| 2018/0222186 | A1 | 8/2018 | Stefani et al. |
| 2018/0250955 | A1 | 9/2018 | Herre |
| 2019/0091712 | A1 | 3/2019 | Medard et al. |

FOREIGN PATENT DOCUMENTS

| | | |
|---|---|---|
| CN | 1438942 A | 8/2003 |
| CN | 1512919 A | 7/2004 |
| CN | 1176815 C | 11/2004 |
| CN | 1668386 A | 9/2005 |
| CN | 1761530 A | 4/2006 |
| CN | 101264698 A | 9/2008 |
| CN | 101309755 A | 11/2008 |
| CN | 101657264 A | 2/2010 |
| CN | 101784348 A | 7/2010 |
| CN | 102177002 A | 9/2011 |
| CN | 102198434 A | 9/2011 |
| CN | 102971080 A | 3/2013 |
| CN | 103153483 A | 6/2013 |
| CN | 103909743 A | 7/2014 |
| CN | 104613205 A | 5/2015 |
| CN | 104994966 A | 10/2015 |
| CN | 105358259 A | 2/2016 |
| CN | 205042649 U | 2/2016 |
| CN | 106414081 A | 2/2017 |
| DE | 1284250 A | 11/1968 |
| DE | 7710895 U1 | 9/1977 |
| DE | 3045401 A1 | 7/1982 |
| DE | 3221327 A1 | 9/1983 |
| DE | 3225554 A1 | 1/1984 |
| DE | 3634747 A1 | 8/1987 |
| DE | 3804092 A1 | 9/1988 |
| DE | 4013322 A1 | 10/1991 |
| DE | 4115111 A1 | 11/1991 |
| DE | 4138491 A1 | 5/1993 |
| DE | 9405600 U1 | 6/1994 |
| DE | 68924202 T2 | 2/1996 |
| DE | 19606716 C1 | 8/1997 |
| DE | 19630290 A1 | 1/1998 |
| DE | 19731829 A1 | 1/1999 |
| DE | 19743804 A1 | 4/1999 |
| DE | 9422327 U1 | 3/2000 |
| DE | 19852079 A1 | 5/2000 |
| DE | 19936790 A1 | 2/2001 |
| DE | 20017629 U1 | 3/2001 |
| DE | 10048749 A1 | 4/2002 |
| DE | 69429354 T2 | 5/2002 |
| DE | 69622407 T2 | 3/2003 |
| DE | 10307719 A1 | 9/2003 |
| DE | 60001898 T2 | 2/2004 |
| DE | 102004021223 A1 | 12/2004 |
| DE | 10331206 A1 | 1/2005 |
| DE | 102004034270 A1 | 2/2006 |
| DE | 102004044655 A1 | 3/2006 |
| DE | 102004049471 A1 | 4/2006 |
| DE | 60212523 T2 | 2/2007 |
| DE | 69836128 T2 | 8/2007 |
| DE | 60125369 T2 | 10/2007 |
| DE | 102006021623 A1 | 11/2007 |
| DE | 102006056051 A1 | 5/2008 |
| DE | 102007018877 A1 | 10/2008 |
| DE | 60132100 T2 | 12/2008 |
| DE | 102007037663 A1 | 2/2009 |
| DE | 10 2008 018 881 A1 | 9/2009 |
| DE | 102008053178 A1 | 5/2010 |
| DE | 102009029946 A1 | 12/2010 |
| DE | 102009038462 A1 | 3/2011 |
| DE | 102010004496 A1 | 7/2011 |
| DE | 102010019612 A1 | 11/2011 |
| DE | 102012006371 A1 | 7/2012 |
| DE | 102012005087 A1 | 10/2012 |
| DE | 102012005650 A1 | 9/2013 |
| DE | 102012212469 A | 1/2014 |
| DE | 102012109123 A1 | 3/2014 |
| DE | 202013101134 U1 | 6/2014 |
| DE | 102013002412 A1 | 8/2014 |
| DE | 102013011107 A1 | 8/2014 |
| DE | 102013205171 A1 | 9/2014 |
| DE | 102014006991 A1 | 12/2014 |
| DE | 102014007523 A1 | 11/2015 |
| DE | 102014008183 A1 | 12/2015 |
| DE | 10 2014 217 892 A1 | 3/2016 |
| DE | 102014012705 A1 | 3/2016 |
| DE | 102014013158 A1 | 3/2016 |
| DE | 10 2016 014 952 A1 | 6/2018 |
| EP | 0138322 A1 | 4/1985 |
| EP | 0297309 A2 | 1/1989 |
| EP | 0665106 A2 | 8/1995 |
| EP | 1120258 A2 | 8/2001 |
| EP | 1270086 A1 | 1/2003 |
| EP | 1764226 A1 | 3/2007 |
| EP | 1852733 A1 | 11/2007 |
| EP | 1884365 A1 | 2/2008 |
| EP | 1946846 A2 | 7/2008 |
| EP | 2002898 A1 | 12/2008 |
| EP | 2133154 A2 | 12/2009 |
| EP | 2151282 A1 | 2/2010 |
| EP | 2196267 A2 | 6/2010 |
| EP | 2380744 A2 | 10/2011 |
| EP | 2433716 A1 | 3/2012 |
| EP | 2468512 A1 | 6/2012 |
| EP | 2641661 A1 | 9/2013 |
| EP | 2644392 A2 | 10/2013 |
| EP | 2777938 A1 | 9/2014 |
| EP | 2799150 A1 | 11/2014 |
| EP | 2842753 A1 | 3/2015 |
| EP | 3002128 A2 | 4/2016 |
| EP | 3156138 A1 | 4/2017 |
| EP | 3213823 A1 | 9/2017 |
| EP | 3257590 A1 | 12/2017 |
| EP | 3272669 A1 | 1/2018 |
| EP | 3068626 B1 | 10/2019 |
| FR | 3010918 A1 | 3/2015 |
| GB | 2200433 A | 8/1988 |
| GB | 2367771 A | 4/2002 |
| GB | 2507069 A | 4/2014 |
| JP | S5722070 A | 2/1982 |
| JP | S62116442 A | 5/1987 |
| JP | H04-106669 U | 9/1992 |
| JP | H0798171 B2 | 10/1995 |
| JP | H09192583 A | 7/1997 |
| JP | 2000158670 A | 6/2000 |
| JP | 2000317354 A | 11/2000 |
| JP | 2001129456 A | 5/2001 |

(56) References Cited

FOREIGN PATENT DOCUMENTS

| | | |
|---|---|---|
| JP | 2001157863 A | 6/2001 |
| JP | 2001239652 A | 9/2001 |
| JP | 2001300404 A | 10/2001 |
| JP | 2005501745 A | 1/2002 |
| JP | 2002361863 A | 12/2002 |
| JP | 2003506210 A | 2/2003 |
| JP | 2003136030 A | 5/2003 |
| JP | 2003164780 A | 6/2003 |
| JP | 2004142382 A | 5/2004 |
| JP | 2004528956 A | 9/2004 |
| JP | 2004337710 A | 12/2004 |
| JP | 2005526234 A | 9/2005 |
| JP | 2007021760 A | 2/2007 |
| JP | 2007152666 A | 6/2007 |
| JP | 2007520340 A | 7/2007 |
| JP | 2007245633 A | 9/2007 |
| JP | 2007289848 A | 11/2007 |
| JP | 2008110332 A | 5/2008 |
| JP | 2009006324 A | 1/2009 |
| JP | 2010528852 A | 8/2010 |
| JP | 2010531213 A | 9/2010 |
| JP | 2010531729 A | 9/2010 |
| JP | 2010241003 A | 10/2010 |
| JP | 2011206958 A | 10/2011 |
| JP | 2012011310 A | 1/2012 |
| JP | 2012506305 A | 3/2012 |
| JP | 2012135925 A | 7/2012 |
| JP | 2012206116 A | 10/2012 |
| JP | 2012228643 A | 11/2012 |
| JP | 2012228660 | 11/2012 |
| JP | 2013067179 A | 4/2013 |
| JP | 2013530816 A | 8/2013 |
| JP | 2013530816 B2 | 8/2013 |
| JP | 2013188706 A | 9/2013 |
| JP | 2014019140 A | 2/2014 |
| JP | 2014050832 A | 3/2014 |
| JP | 2014111307 A | 6/2014 |
| JP | 2015-009222 A | 1/2015 |
| JP | 2015027636 A | 2/2015 |
| JP | 2015096322 A | 5/2015 |
| JP | 2015520011 A | 7/2015 |
| JP | 2015193129 A | 11/2015 |
| JP | 2015535735 A | 12/2015 |
| JP | 2016507372 A | 3/2016 |
| JP | 2016526910 A | 9/2016 |
| JP | 2016175077 A | 10/2016 |
| JP | 2016175662 A | 10/2016 |
| JP | 2018012065 A | 1/2018 |
| JP | 2020513311 A | 5/2020 |
| JP | 2020513314 A | 5/2020 |
| WO | 8601775 A1 | 3/1986 |
| WO | 9856585 A1 | 12/1998 |
| WO | 02098576 A1 | 12/2002 |
| WO | 03021519 A1 | 3/2003 |
| WO | 2003062129 A2 | 7/2003 |
| WO | 2004048112 A1 | 6/2004 |
| WO | 2004085738 A2 | 10/2004 |
| WO | 2005016556 A1 | 2/2005 |
| WO | 2005075170 A1 | 8/2005 |
| WO | 2006022217 A1 | 3/2006 |
| WO | 2007121905 A1 | 11/2007 |
| WO | 2009019036 A1 | 2/2009 |
| WO | 2010046064 A1 | 4/2010 |
| WO | 2010146473 A1 | 12/2010 |
| WO | 2011044491 A1 | 4/2011 |
| WO | 2011128439 A1 | 10/2011 |
| WO | 2011138048 A1 | 11/2011 |
| WO | 2013121565 A1 | 8/2013 |
| WO | 2015071270 A1 | 5/2015 |
| WO | 2015096322 A1 | 7/2015 |
| WO | 2015186014 A1 | 12/2015 |
| WO | 2016-087016 A1 | 6/2016 |
| WO | 2016142510 A1 | 9/2016 |
| WO | 2016145000 A1 | 9/2016 |
| WO | 2017006245 A1 | 1/2017 |
| WO | 2017006246 A1 | 1/2017 |
| WO | 2018102846 | 6/2018 |
| WO | 2018108565 A1 | 6/2018 |

OTHER PUBLICATIONS

Non-Final Office Action dated Feb. 5, 2021 for U.S. Appl. No. 16/468,701 (80 pages).
Non-Final Office Action dated Feb. 18, 2021 for U.S. Appl. No. 16/468,692 (97 pages).
EPO Official Notification of Opposition for Application No. 17821803.8 mailed Feb. 10, 2021 (64 pages; with English machine translation).
Ghasem, G. et al.; "Chapter 2 Background on Sprays and Their Production", Industrial Sprays and Atomization: Design, Analysis and Applications, Jan. 1, 2002, Springer, London, pp. 7-33, XP009195118, ISBN: 978-1-4471-3816-7.
International Search Report and Written Opinion for PCT/EP2017/081141 dated Feb. 26, 2018 (17 pages; with English translation).
International Search Report and Written Opinion for PCT/EP2017/081114 dated May 15, 2018 (33 pages; with English translation).
Anonymous: "Roboterkalibrierung—Wikipedia", Nov. 7, 2016, XP055471615, Gefunden im Internet: URL: https://de.wikipedia.org/w/index.php?title=Roboterkalibrierung&oldid=159460756 [gefunden am Apr. 30, 2018] das ganze dockument (8 pages; with English translation).
Beyer, Lukas: "Genauigkeitssteigerung von Industrierobotern", Forschungsberichte Aus Dem Laboratorium Fertigungstechnik/Helmut-Schmidt-Universitat, Universitat Der Bundeswehr Hamburg, Dec. 31, 2005, Seiten 1-4, XP009505118; ISSN: 1860-2886; ISBN: 978-3-8322-3681-6 (13 pages; with English machine translation).
International Search Report and Written Opinion for PCT/EP2017/081108 dated Feb. 28, 2018 (with English translation; 18 pages).
International Search Report and Written Opinion for PCT/EP2017/081099 dated Feb. 26, 2018 (21 pages; with English translation).
International Search Report and Written Opinion for PCT/EP2017/081102 dated Mar. 14, 2018 (16 pages; with English translation).
International Search Report and Written Opinion for PCT/EP2017/081105 dated Feb. 26, 2018 (19 pages; with English translation).
International Search Report and Written Opinion for PCT/EP2017/081152 dated May 15, 2018 (25 pages; with English translation).
International Search Report and Written Opinion for PCT/EP2017/081098 dated May 14, 2018 (26 pages; with English translation).
International Search Report and Written Opinion for PCT/EP2017/081101 dated Feb. 28, 2018 (14 pages; with English translation).
International Search Report and Written Opinion for PCT/EP2017/081121 dated Feb. 26, 2018 (20 pages; with English translation).
International Search Report and Written Opinion for PCT/EP2017/081117 dated Mar. 12, 2018 (27 pages; with English translation).
International Search Report and Written Opinion for PCT/EP2017/081123 dated Feb. 26, 2018 (20 pages; with English translation).
EPO Examination Report for Application No. 201702818.1 dated Dec. 18, 2020 (with English machine translation; 6 pages).
Chinese Office Action for Application No. CN20178007017.9 dated Aug. 31, 2020 (8 pages; with English translation).
Non Final Office Action for U.S. Appl. No. 16/468,697 dated Oct. 22, 2020 (78 pages).
Non Final Office Action for U.S. Appl. No. 16/468,696 dated Nov. 2, 2020 (58 pages).
Non Final Office Action for U.S. Appl. No. 16/468,689 dated Oct. 15, 2020 (77 pages).
Chinese Office Action for CN201780077476.7 dated Sep. 23, 2020 (12 pages; English translation not available).
Non Final Office Action for U.S. Appl. No. 16/468,700 dated Dec. 1, 2020 (73 pages).
JPO Submission for JP2019-531096; submitted Dec. 21, 2020 (32 pages; with English translation).
JPO Submission for JP2019-531957; submitted Dec. 21, 2020 (21 pages; with English translation).
Non-Final Office Action for U.S. Appl. No. 16/468,691 dated Jan. 7, 2021 (79 pages).

(56) References Cited

OTHER PUBLICATIONS

European Search Report for EP20170638.9 dated Sep. 14, 2020 (4 pages—English translation not available).
European Search Report for EP20170021.8 dated Sep. 8, 2020 (11 pages—English translation not available).
European Search Report for EP20170025.9 dated Sep. 9, 2020 (4 pages—English translation not available).
European Search Report for EP20170016.8 dated Sep. 7, 2020 (4 pages—English translation not available).
China National Intellectual Property Administration Office Action and Search Report for CN Application No. 201780077018.3 dated Aug. 27, 2020 (11 pages; Search Report in English).
Final Office Action dated Mar. 19, 2021 for U.S. Appl. No. 16/468,696 (45 pages).
Final Office Action dated Jun. 11, 2021 for U.S. Appl. No. 16/468,701 (53 pages).
Notification of Reasons for Refusal for Application No. JP2019-532012 dated Jun. 22, 2021 (6 pages; with English machine translation).
Notification of Reasons for Refusal for Application No. JP2019-527330 dated Jun. 22, 2021 (10 pages; with English machine translation).
JPO Office Action dated Jul. 3, 2021 for Application No. JP2019-532024 (12 pages; with English machine translation).
Non-Final Office Action dated Aug. 27, 2021 for U.S. Appl. No. 16/468,695 (149 pages).
Final Office Action dated Apr. 19, 2021 for U.S. Appl. No. 16/468,700 (62 pages).
Japenese Patent Office Notice of Reasons of Refusal for Application No. JP 2019-531967 dated Jun. 8, 2021 (8 pages; with English machine translation).
Notice of Allowance mailed in U.S. Appl. No. 16/468,689 dated Jun. 2, 2021 (38 pages).
JPO Notification of Reasons for Rejection for Application No. JP2019-532030 dated May 18, 2021 (6 pages; with English translation).
CIPO Office Action for Application No. CN201780077474.8 dated Apr. 26, 2021 (17 pages; with English translation).
Chinese Office Action dated Jun. 2, 2021 for Application No. CN201780077017.9 (17 pages; with English machine translation).
Japanese Notification of Reasons for Rejection dated Jun. 1, 2021 for Application No. JP2019-531944 (14 pages; with English machine translation).
Japanese Notification of Reasons for Rejection dated Jun. 8, 2021 for Application No. JP2019-531957 (13 pages; with English machine translation).
Supplemental Notice of Allowability dated Jul. 8, 2021 for U.S. Appl. No. 16/468,696 (11 pages).
Liptak, Bela. (2006). Instrument Engineers' Handbook (4th Edition)—Process Control and Optimization, vol. 2—2.1.3.5 Process Time Constant, (pp. 99-102). Taylor & Francis. Retrieved from https://app.knovel.eom/hotlink/pdf/id:kt00CC7HL1/instrument-engineers/process-time-constant (Year: 2006).
Fianl Office Action dated May 13, 2021 for U.S. Appl. No. 16/468,691 (70 pages).
JPO Office Action for Application No. JP2019-531097 dated Jun. 29, 2021 (10 pages; with English machine translation).
JPO Office Action for Application No. 2019-531096 dated Jul. 6, 2021 (9 pages; with English machine translation).
JPO Office Action for Application No. 2019-531098 dated Jul. 6, 2021 (5 pages; English translation only).
JPO Office Action for Application No. 2019-531459 dated Jul. 6, 2021 (8 pages; with English machine translation).
JPO Decision to Grant dated Oct. 3, 2021 for Application No. JP2019-532113 (7 pages; with English machine translation).
Final Office Action dated Oct. 7, 2021 for U.S. Appl. No. 16/468,693 (58 pages).
Non Final Office Action dated Nov. 23, 2021 for U.S. Appl. No. 16/468,694 (163 pages).
Chinese Office Action in related application No. CN201780077045.0 dated Jan. 29, 2022 (17 pages; English machine translation provided).
JPO Decision to Grant in related application No. JP2019-532030 dated Dec. 1, 2022 (6 pages; English machine translation provided).
Non-Final Office Action dated Jan. 6, 2022 for related U.S. Appl. No. 16/468,701 (36 pages).
JPO Decision to Grant in related application JP2019-532012 dated Jan. 25, 2022 (6 pages; with English machine translation).
Non-Final Office Action for related U.S. Appl. No. 16/468,699 dated Mar. 9, 2022 (180 pages).
EPO Notification of Objection dated May 18, 2022 for related Patent No. EP3718643 (55 pages; with English machine translation).

* cited by examiner

COATING DEVICE FOR COATING COMPONENTS

CROSS-REFERENCE TO RELATED APPLICATIONS

This application is a national stage of, and claims priority to, Patent Cooperation Treaty Application No. PCT/EP2017/081102, filed on Dec. 1, 2017, which application claims priority to German Application No. DE 10 2016 014 952.3, filed on Dec. 14, 2016, which applications are hereby incorporated herein by reference in their entireties.

BACKGROUND

The disclosure concerns a coating device for coating components with a coating agent, in particular for painting vehicle body parts.

For the serial painting of car body components, rotary atomizers are usually used as application devices, which have the disadvantage of a limited application efficiency, i.e. only a part of the applied paint is deposited on the components to be coated, while the rest of the applied paint has to be disposed of as so-called overspray.

A newer development line, on the other hand, provides for so-called printheads as application device, as known for example from DE 10 2013 002 412 A1, U.S. Pat. No. 9,108,424 B2 and DE 10 2010 019 612 A1. In contrast to the known rotary atomizers, such printheads do not emit a spray of the paint to be applied, but rather a narrowly confined paint jet, which is deposited almost completely on the component to be painted, so that virtually no overspray occurs.

However, when coating a limited area (e.g. a decor) on a component surface using such a printhead, the paint jet must be controlled very precisely in terms of time and space so that the boundaries of the area to be coated are adhered to without exceeding or falling below the boundaries of the area to be coated during painting. In order to be able to produce cost-effectively and competitively or to achieve high area performances, the applicators must be moved quickly with the robot, e.g. at a drawing speed in the range of 0.5 m/s to 0.75 m/s. The combination of exact switch-on and switch-off positions of the applicators or their individual valves as well as the high painting speed results in the necessity of very short reaction times or control pulses (e.g. 1 ms, 500 µs, 100 µs, 10 µs), which are usually not possible with robot controls. For this purpose, printhead valves in the printhead must be switched on or off very precisely in order to switch the painting beam on or off accordingly. However, this is not possible with the usual robot controls, since these robot controls work with a specified cycle time, whereby the cycle time of the robot control is too long, in order to achieve the necessary temporal accuracy with the control of the printhead valves.

From EP 2 196 267 A2 a coating system is known, in which a coating robot moves a printhead over the components to be coated. The coating robot is controlled by a robot control. In addition to the robot control, a separate control unit is provided, which controls a metering unit and sets the desired paint flow. A separate printhead control is not known from this publication.

With regard to the general technical background of the disclosure, reference is made to DE 10 2010 004 496 A1 and DE 10 2014 013 158 A1.

DETAILED DESCRIPTION

Figure 1:
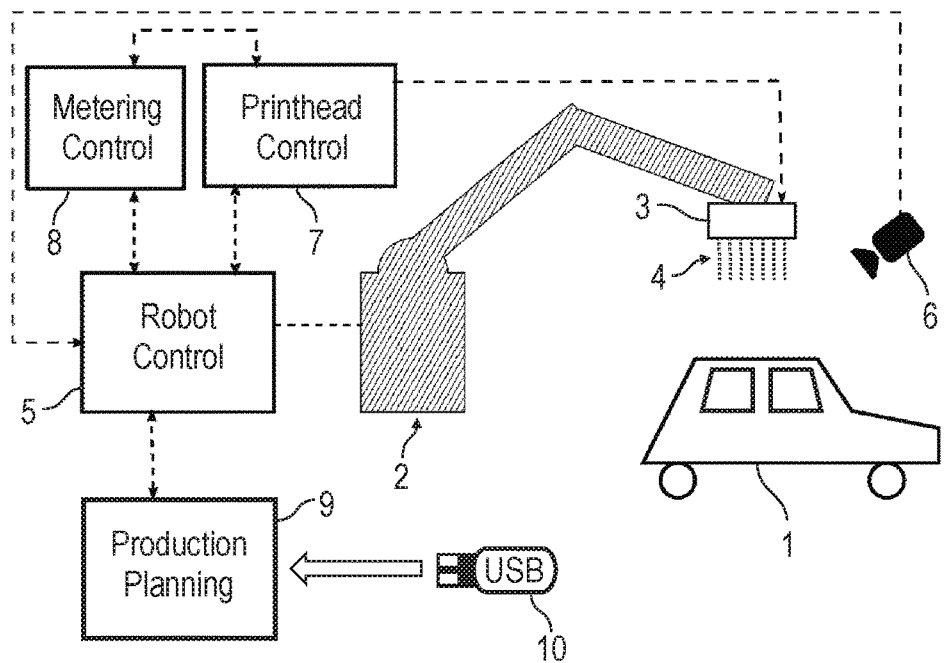
FIG. 1 shows a highly simplified schematic representation of a painting installation according to the disclosure, FIG. 2 gives a schematic representation to explain the problem underlying the disclosure and the solution in accordance with the disclosure.

The disclosure comprises the general technical teaching that the printhead valves in the printhead are not controlled by the robot control that controls the coating robot. Instead, the disclosure provides for a separate printhead control which controls the printhead valves in the printhead and operates sufficiently fast to achieve the required temporal and spatial accuracy in the control of the paint jets emitted. There should be communication with the robot control in order to instruct the printhead control accordingly.

The coating device according to the disclosure is used for coating components, such as vehicle body parts. However, the disclosure is not limited to vehicle body components with regard to the type of components to be coated. Rather, the components to be coated may also be other components.

It should also be mentioned that the coating device is preferably designed for coating components with a paint, i.e. the coating agent to be applied is preferably a paint, such as a solvent-based paint, a water-based paint, a colouring base coat or a clear coat, to name just a few examples. However, the disclosure is not limited to paints with regard to the type of coating to be applied, but can also be realized with other types of coating agents, such as adhesives, insulating materials, sealants, primers, etc., to name just a few examples.

The coating device according to the disclosure has a printhead with at least one nozzle as application device in order to deliver a coating agent jet onto the component to be coated, whereby the coating agent delivery through the nozzle is controlled by means of a printhead valve.

The term "printhead" used in the context of the disclosure is initially to be understood generally and serves only to distinguish it from conventional atomizers (e.g. rotary atomizers), which do not emit a spatially narrowly limited jet of coating agent, but a spray of the coating agent. Preferably, however, the printhead is a printhead as described for example in DE 10 2013 002 412 A1, U.S. Pat. No. 9,108,424 B2 and DE 10 2010 019 612 A1.

Furthermore, the coating device according to the disclosure includes a multi-axis coating robot that guides the printhead over the surface of the component to be coated. The coating robot preferably features serial robot kinematics with at least six or seven movable robot axes and a robot hand axis to guide the printhead over the component surface in a highly movable manner. Such coating robots are known from the state of the art and therefore do not need to be described in detail.

In addition, the coating device in accordance with the disclosure features a state-of-the-art robot control that controls the coating robot.

As already mentioned briefly above, the coating device according to the disclosure now distinguishes itself from the state of the art by a separate printhead control which is separated from the robot control and which controls at least one printhead valve, whereby the printhead control works sufficiently fast to achieve the required temporal and spatial accuracy in the control of the coating agent release.

It has already been mentioned briefly at the beginning that the robot control usually controls the coating robot with a specified first cycle time, whereby this first cycle time is too long to achieve the desired temporal and spatial accuracy of the coating release when controlling the printhead valve. The printhead control according to the disclosure works preferably clocked with a specified second cycle time, whereby this second cycle time of the printhead control is shorter than the first cycle time of the robot control, so that the printhead control can achieve the required temporal and spatial accuracy of the control of the coating release when controlling the printhead valve.

At a printhead travel speed, the position of the printhead is known only in quantized units of the robot control clock rate. At a travel speed of v=750 mm/s and a robot control clock rate of 4 ms, this position quantization is 3 mm. This is not sufficient for a more precise positioning (<1 mm, <0.1 mm) of the switch-on or switch-off point of the coating agent on the substrate, e.g. exactly at the edge of the substrate.

The second cycle time of the printhead position is therefore preferably at most 100 ms, 50 ms, 20 ms, 10 ms, 5 ms, 1 ms or even at most 100 µs.

The printhead control is preferably connected to the robot control on the input side and receives the current spatial position, the current spatial position and/or the current speed and/or the current spatial orientation of the printhead and/or the coating object as input information from the robot control at the robot control clock rate, so that the printhead control can take this information into account when controlling the printhead valve.

The printhead control interpolates or extrapolates (e.g. linear, with splines, cubically) these positions to its own time steps so that it obtains a higher position resolution. Thus the switch-on or switch-off point of the coating agent flow or coating agent drop can be set exactly.

The printhead control can also be integrated into the robot control as an independently operating module, for example.

It should also be mentioned that the coating device according to the disclosure preferably includes a colour changer which selects one of several coating agents and forwards the selected coating agent to the printhead.

In addition, the coating device according to the disclosure preferably includes a metering pump which meters the coating agent to be applied and transports it to the printhead.

In the preferred example of the disclosure, the printhead control controls not only the at least one printhead valve of the printhead, but preferably also the color changer and/or the metering pump.

It has already been mentioned above that the printhead control can switch the coating agent jet applied by the printhead on and off highly dynamically and precisely timed in order to achieve coating patterns with a very precise spatial resolution on the component surface. This is important, for example, if a surface to be coated has a sharp edge that must be adhered to exactly during the coating process. The printhead control works therefore preferably so fast and exact that the coating agent jet on the component surface reaches an exact spatial resolution of less than ±2 mm, ±1 mm, ±0.5 mm or even less than ±0.1 mm.

To achieve such an accurate coating, a measuring device is preferably provided which measures the spatial position and/or orientation of the component to be coated and transmits the determined position and/or orientation to the printhead control so that the printhead control can take this into account when controlling the printhead valves. The measuring device can be connected either directly to the printhead control or indirectly to the printhead control via the robot control. The only decisive factor in the disclosure is that the determined position or orientation of the component to be coated can be taken into account when controlling the printhead valves.

In a preferred embodiment of the disclosure, the measuring device has a camera which takes an image of the component to be coated, whereby this image is evaluated by an image evaluation unit which determines the spatial position or orientation of the component to be coated. Within the scope of the disclosure, it is also possible that several cameras are arranged at different positions in order to increase the accuracy of the position determination.

In one example of the disclosure, the measuring device can determine the spatial position and/or orientation of the component to be coated with a very high accuracy and a correspondingly low position tolerance, whereby the position tolerance is preferably smaller than ±2 mm, ±1 mm, ±0.5 mm, ±0.25 mm or even smaller than ±0.1 mm.

In one example of the disclosure, the coating device has, in addition to the printhead control and the robot control, an additional metering control for the aforementioned metering device (e.g. metering cylinder, metering pump, etc.), which meters the coating agent and conveys it to the printhead.

The metering control is preferably connected to the printhead control in order to synchronize the control of the metering pump with the control of the printhead valves of the printhead. If, for example, numerous printhead valves are suddenly opened, the consumption of coating agent suddenly increases, so that the metering pump should also be operated at a higher capacity.

In addition, the metering control is preferably also connected to the robot control in order to synchronize the control of the metering pump with the control of the coating robot. If, for example, the robot control controls the coating robot in such a way that the printhead is moved over the component surface at a high drawing speed, a large coating quantity usually also has to be conveyed by the metering pump, so that synchronisation of the robot control on the one hand and the metering control on the other hand is advantageous.

It has already been mentioned several times that the disclosure enables a highly dynamic and precise control of the printhead valves by providing a separate printhead control that works sufficiently fast. However, this only makes sense if the printhead valves themselves work sufficiently fast. The printhead valves therefore preferably have a very short switching time of at most 100 ms, 50 ms, 20 ms, 5 ms, 1 ms or even at most 100 µs. A very good reproducibility or repeatability of the switching times of all valves is even more important in order to correct them individually if necessary.

It should also be mentioned that the coating device according to the disclosure may have a first data interface for communicating with production planning, but this is known from the state of the art and therefore does not need to be described in detail.

In addition, the disclosure-based coating device may have a second data interface for recording a control file, whereby the control file may, for example, specify a graphic that is to be applied to the component surface by the coating device. This second data interface can, for example, be implemented using a USB stick reader (USB: Universal Serial Bus) or a memory card reader, to name just a few examples.

Furthermore, the disclosure offers the possibility of maintaining paint statistics. Furthermore, a paint requirement quantity calculation can follow within the framework of the disclosure. In addition, it is possible to communicate with a graphic visualization computer. Furthermore, the disclosure offers the possibility of communication with a safety control. In this case, a paint release can be carried out by a higher-level control system, which also checks whether a supply air system is in operation and whether there are any safety-relevant malfunctions. In addition, the printhead control can also release the paint if it determines that the colour print is in order, the metering pump is working, the coating robot is in its initial position, the optical measurement is complete, the vehicle has been measured and a position correction has been carried out.

It is also worth mentioning that the printhead preferably emits a narrowly limited jet of coating agent as opposed to a spray mist, as is the case with conventional atomizers (e.g. rotary atomizers).

In a variant of the disclosure, the printhead emits a droplet jet consisting of numerous droplets separated from each other in the longitudinal direction of the droplet jet, as opposed to a jet of coating agent hanging together in the longitudinal direction of the jet.

In another variant of the disclosure, the printhead, on the other hand, emits a coating medium jet being continuous in the longitudinal direction of the jet, in contrast to a droplet jet.

These two variants (droplet jet and continuous coating agent jet) can also be combined within the scope of the disclosure. For example, the printhead can alternately emit a droplet jet and a continuous coating agent jet. Furthermore, in the frame of the disclosure there is the possibility that a part of the nozzles of the printhead emits a droplet jet, while at the same time another part of the nozzles of the same printhead emits a continuous coating agent jet in the longitudinal direction of the jet.

It should also be mentioned that the coating medium pressure is preferably controlled with a relatively small fluctuation range of maximum ±500 mbar, ±200 mbar, ±100 mbar or even ±50 mbar.

The advantage of using a printhead as an application device is the high application efficiency, which is preferably greater than 80%, 90%, 95% or even 99%, so that the printhead is essentially overspray-free.

It should also be mentioned that the printhead preferably has a sufficiently high area coating performance to be able to paint vehicle body components efficiently. The printhead therefore preferably has a surface coating performance of at least 0.5 m$^2$/min, 1 m$^2$/min, 2 m$^2$/min or even 3 m$^2$/min.

It should also be mentioned that the volume flow of the applied coating agent and thus the exit speed of the coating agent is preferably adjusted in such a way that the coating agent does not bounce off the component after hitting it or does not penetrate the lower paint layer wet-on-wet or push it to the side or displace it in the case of a paint application. The coating agent exit velocity from the printhead can therefore be in the range of 5 m/s to 30 m/s, for example, and any intermediate intervals are possible.

The application distance (i.e. the distance between nozzle and component surface) is preferably in the range of 4 mm to 200 mm.

It should also be mentioned that the printhead valve preferably has an electrically controllable actuator, such as a magnetic actuator or a piezo actuator, to enable the desired fast response.

FIG. 1 shows a highly simplified schematic representation of a painting system according to the disclosure for painting car body components 1 with a paint.

The car body components 1 are conventionally conveyed by a conveyor along a painting line through the painting installation, which is known from the state of the art and is therefore not shown for simplification.

The painting is done by a multi-axis painting robot 2 with a serial robot kinematics and several robot arms and a highly movable robot hand axis, which guides a printhead 3 as application device. The printhead 3 then emits coating agent jets 4 onto the surface of the vehicle body part 1, as shown schematically.

It should be mentioned here that the painting robot 2 is arranged in a painting booth, which typically contains several such painting robots 2 on both sides of the painting line, whereby only one single painting robot 2 is shown for simplification.

The painting robot 2 can be controlled in a conventional way by a robot control 5, whereby the robot control 5 operates with a specified cycle time and therefore only allows positioning with a limited spatial resolution according to the cycle time. The spatial resolution that can be achieved in this way, however, is not sufficiently accurate to allow the printhead 3 to coat the component surface with local accuracy.

The coating device according to the disclosure therefore additionally has a camera 6, which takes a picture of the motor vehicle body component 1 and the painting robot 2 in order to enable an exact relative positioning of the painting robot 2 with the printhead 3 relative to the motor vehicle body component 1.

The image captured by camera 6 is then evaluated by an image evaluation unit, whereby the image evaluation unit is not shown here for simplification.

It should also be mentioned that within the scope of the disclosure there is the possibility that several such cameras 6 are provided, which record the painting robot 2 and the vehicle body part 1 from different perspectives and thus enable a higher accuracy in position determination.

It has already been mentioned above that the robot control 5 has a relatively long cycle time which does not allow the required spatial accuracy to control the printhead 3 with high accuracy. The coating device according to the disclosure therefore preferably has a separate printhead control 7, which controls the printhead valves located in the printhead 3, which are not shown for simplification, highly precisely and highly dynamically.

The printhead control 7 is connected on the input side to the robot control 5 and receives from the robot control 5 the current position and orientation of the vehicle body series component 1 relative to the printhead 3, in order to be able to take this input information into account when controlling the printhead valves in the printhead 3.

It should also be mentioned that the coating device has, among other things, a colour changer and a metering pump, which are not shown for simplification. The colour changer and the metering pump are controlled by an additional metering control 8, which is connected to the printhead control 7 and the robot control 5.

In addition, a data interface to production planning 9 is provided.

Production planning 9 in turn has a data interface, for example in the form of a USB stick reader, so that a control file can be read in using a USB stick 10, which defines a graphic (e.g. a decor) that is to be applied to the component surface of the vehicle body component.

Here it is possible for the control file to be transferred directly from the end customer to the factory via the car dealerships. In the production software, the graphic is then assigned to the number of the car body. Data is then transferred to the robot control via an interface of the production software and identification is usually carried out via reading points and data carriers on the body. Not only the serial number can be stored on the data carrier, but also other data, if necessary the graphic data.

In general it should be mentioned that the robot control 5, the printhead control 7 and the metering control 8 are preferably designed as separate hardware components and are separated from each other.

Within the scope of the disclosure, however, there is also the possibility that the robot control 5, the printhead control 7 and the metering control 8 can only be implemented as separate software components in an otherwise uniform control unit.

Figure 2:
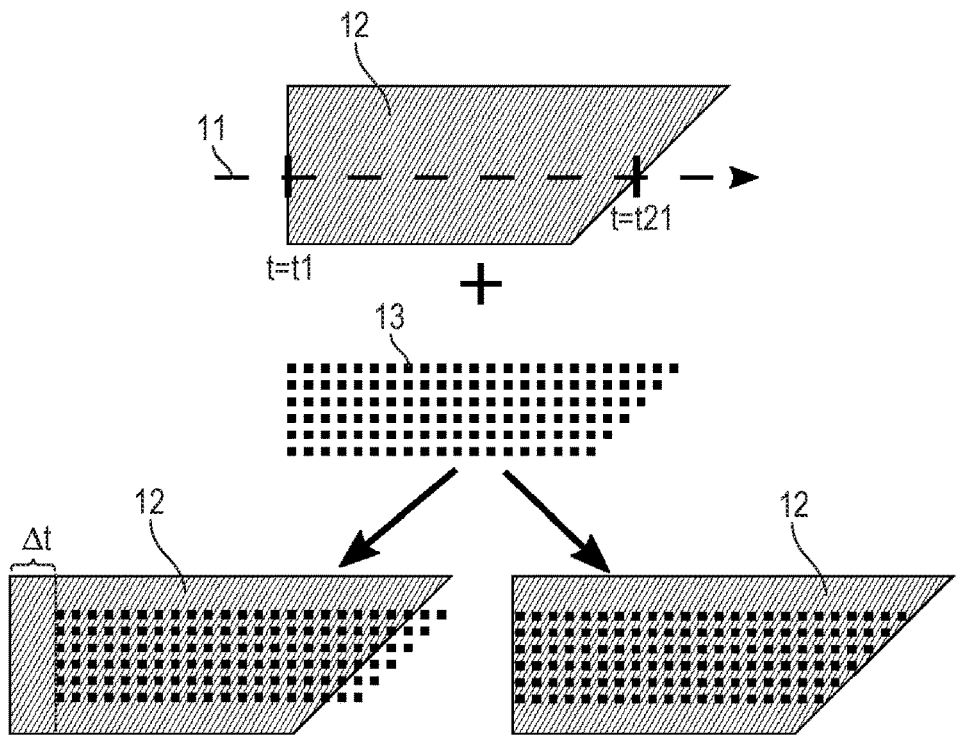

In the following, the schematic representation in FIG. 2 is explained. FIG. 2 shows a programmed movement path 11 in the upper area, whereby the printhead 3 is moved along the programmed movement path 11 over the surface of the motor vehicle body component 1.

In addition, FIG. 2 shows in the upper area a limited area 12 to be coated, which is covered by the printhead 3 along the programmed movement path 11. At the time t=t1 the printhead 3 then passes the left boundary of the area 12 to be coated, so that the coating should also begin at this time. At the time t=t2 the printhead 3 then passes the opposite boundary of the surface 12 to be coated, so that the printhead 3 should stop the coating at exactly this time.

FIG. 2 shows in the middle area the actual opening times 13 of the printhead valves of the printhead 3. For simplification it is assumed that the printhead 3 has six nozzles in a row. In practice, however, printhead 3 actually has a larger number of nozzles and a larger number of nozzle rows, which is irrelevant for the principle of the disclosure.

If the printhead valves of printhead 3 are controlled exactly in time, the actual opening times 13 of the printhead valves of printhead 3 are exactly within the area 12 to be coated, as shown in FIG. 2, bottom right.

Figure 4:
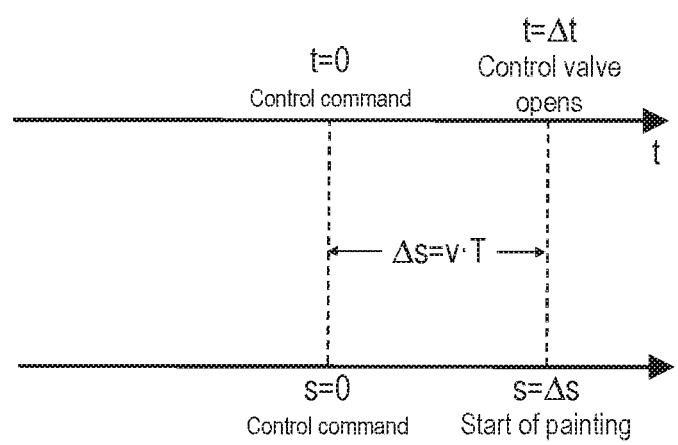

In fact, however, the printhead valves in printhead 3 would open with a time offset Δt when controlled by the relatively slow robot control 5 when printhead 3 passes the boundary of the area to be coated 12 along the programmed movement path 11. This means that the surface 12 to be coated is only coated with a corresponding spatial offset Δs=v·Δt, as shown in FIG. 4. The spatial offset Δs and thus the achievable spatial resolution during coating depends here on the drawing speed v of the printhead 3 along the programmed movement path 11 and the temporal offset Δt. The offset can, for example, be compensated by a lead time. One problem, however, is the timing of the control, which generates a repeat error ("jitter"). It is therefore important that the control of the printhead valves in the printhead 3 is highly dynamic and highly precise in terms and timing.

Figure 3:
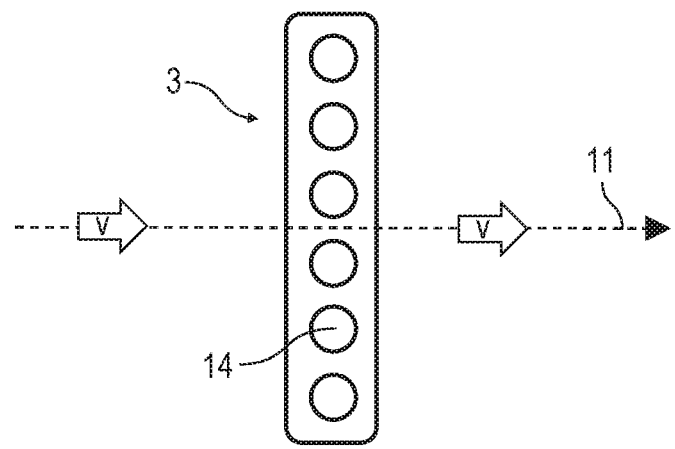
FIG. 3 shows a schematic representation of a printhead moving along a programmed path across the component surface, FIG. 4 a schematic illustration to illustrate the problem of delayed printhead valve response.

FIG. 3 shows a simplified schematic representation of the printhead 3 with six nozzles 14 arranged in a single nozzle row. In practice, however, the printhead 3 typically has a larger number of nozzles 14 per nozzle row and a larger number of nozzle rows, which is not significant for the disclosure.

Figure 5:
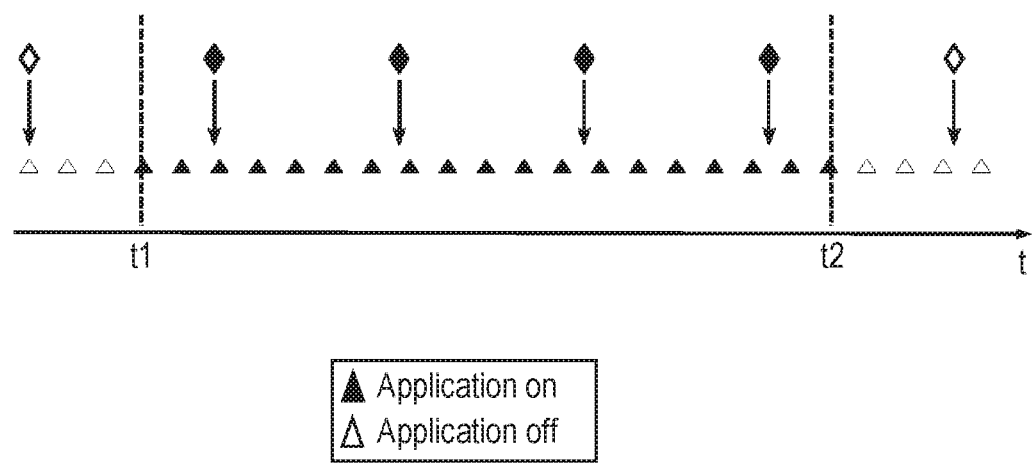
FIG. 5 shows a schematic diagram to illustrate the interpolation of the positions in the printhead control from the positions in the robot control.

FIG. 5 shows a schematic diagram to illustrate the interpolation of the printhead control positions from the robot control positions.

The upper part of the drawing shows the positions stored in the robot control along a time axis, whereby the positions are represented as time markers ◆ or time markers ◇. Below this, the drawing shows the positions along the time axis stored in the printhead control.

The filled-in time markers ◆ each illustrate a time at which coating agent is applied, while the blank time markers ◇ each symbolize a time at which no coating agent is applied.

It can be seen from the drawing that the temporal resolution and thus also the spatial resolution of the positions in the robot control is considerably coarser and thus less accurate than in the printhead control.

The printhead control enables this finer spatial resolution of the positions by the printhead control interpolating finer positions from the relatively coarse positions of the robot control.

The printhead is moved along a given movement path over the component surface, where the coating should start at time t=t1 and end again at time t=t2. It can be seen from the drawing that the coating is started or finished very precisely at the desired points in time t=t1 or t=t2, which is made possible by the aforementioned interpolation.

The disclosure is not limited to the embodiment described above. Rather, the disclosure also claims protection for the subject-matter and the features of the dependent claims independently of the referenced claims and in particular also without the features of the main claim.

The invention claimed is:

1. Coating device for coating components with a coating agent, with
    a) a printhead with
        a plurality of nozzles for delivering a coating agent jet to the component to be coated, and
        a plurality of printhead valves controlling the release of coating agent through the plurality of nozzles,
    b) a multi-axis coating robot which guides the printhead over the surface of the component to be coated,
    c) a robot control which controls the coating robot, and
    d) a printhead control that controls the printhead valves, the printhead control connected on the input side to the robot control and receives from the robot control at least one of a current spatial position, a current speed, and a current spatial orientation of the printhead as input information.

2. Coating device according to claim 1, wherein
    a) the robot control controls the coating robot with a specific first cycle time in a clocked manner, and
    b) the printhead control controls a printhead valve of the plurality of printhead valves of the printhead in a clocked manner with a specific second cycle time,
    c) the second cycle time of the printhead control is shorter than the first cycle time of the robot control.

3. Coating device according to claim 2, wherein the second cycle time of the printhead control is at most 100 ms.

4. Coating device according to claim 1, wherein the printhead control controls at least one of the following in addition to the plurality of printhead valves of the printhead:
    a) a color changer which selects one of a plurality of coating means and forwards the selected coating means to the printhead,
    b) a metering device which meters the coating agent to be applied.

5. Coating device according to claim 1, wherein the printhead control can switch on and switch off the coating agent jet applied by the printhead in a time-controlled manner with a spatial resolution on the surface of the component to be coated of less than ±2 mm.

6. Coating device according to claim 1, further comprising:
    a) a measuring device for measuring the spatial position of the component to be coated, the measuring device being connected on the output side to the printhead control and transmitting the spatial position of the component to be coated to the printhead control, and b) a mechanical positioning device for precise positioning of the component to be coated.

7. Coating device according to claim 6, wherein the measuring device comprises the following:

a) at least one sensor for position determination, and b) an evaluation unit which evaluates a sensor signal of the sensor and determines therefrom the spatial position of the component to be coated.

8. Coating device according to claim 6, wherein the measuring device determines the spatial position of the component to be coated with a position tolerance of less than ±2 mm.

9. Coating device according to claim 1, wherein a) the coating device has a metering control for controlling a metering device which meters the coating agent and conveys it to the printhead, and b) the metering control is connected to the robot control in order to synchronize the control of the metering device with the control of at least one printhead valve of the plurality of printhead valves of the printhead, and c) the metering control is connected to the robot control in order to synchronize the control of the metering device with the control of the coating robot.

10. Coating device according to claim 1, wherein the at least one printhead valve of the printhead has a short switching time of at most 100 ms.

11. Coating device according to claim 1, further comprising a first data interface for communication with a production planning.

12. Coating device according to claim 11, further comprising a second data interface for receiving a control file for coating the component with a graphic, the graphic being predetermined by the control file.

13. Coating device in accordance with claim 1, wherein the printhead emits a continuous jet of coating medium in a longitudinal direction or a droplet jet consisting of numerous droplets separated from each other in the longitudinal direction and aligned along the longitudinal direction, in contrast to a spray mist.

14. Coating device according to claim 1, wherein coating agent pressure is controlled with a maximum variation of ±500 mbar.

15. Coating device according to claim 1, wherein the printhead has an application efficiency of at least 90% so that substantially all of the applied coating agent is completely deposited on the component without overspray.

16. Coating device according to claim 1, wherein the printhead has a surface coating performance of at least 0.5 $m^2$/min.

17. Coating device according to claim 1, wherein a printhead valve of the plurality of printhead valves has an electrically controllable actuator in order to eject drops of the coating agent from the printhead.

18. Coating device according to claim 6, wherein the measuring device for measuring the spatial position of the component to be coated is a camera.

19. Coating device according to claim 18, further comprising an evaluation unit that evaluates a picture of the component to be coated and the printhead taken by the camera to extract the position of the printhead relative to the component to be coated.

20. Coating device for coating components with a coating agent, with a) a printhead with
a plurality of nozzles for delivering a coating agent jet to the component to be coated, and
a plurality of printhead valves controlling the release of coating agent through the plurality of nozzles, b) a multi-axis coating robot which guides the printhead over the surface of the component to be coated, c) a robot control which controls the coating robot, and d) a printhead control that controls the printhead valves and at least one of a color changer which selects one of a plurality of coating means and forwards the selected coating means to the printhead and a metering device which meters the coating agent to be applied.

21. Coating device in accordance with claim 20, wherein the printhead emits a continuous jet of coating medium in a longitudinal direction or a droplet jet consisting of numerous droplets separated from each other in the longitudinal direction and aligned along the longitudinal direction, in contrast to a spray mist.

* * * * *